Patented Apr. 19, 1932

1,854,882

UNITED STATES PATENT OFFICE

WILLIAM S. CALCOTT, OF PENNS GROVE, AND NORMAN C. SOMERS, OF CARNEYS POINT, NEW JERSEY, ASSIGNORS TO E. I. DU PONT DE NEMOURS & COMPANY, OF WILMINGTON, DELAWARE, A CORPORATION OF DELAWARE

PHTHALIC ANHYDRIDE

No Drawing.    Application filed May 11, 1929. Serial No. 362,448.

This invention relates to the production of phthalic anhydride by the catalytic oxidation of naphthalene and specifically the production of phthalic anhydride, while eliminating certain undesirable by-products which have heretofore attended the process.

Phthalic anhydride has been extensively produced by a process which consists in passing a mixture of vaporized napthalene and air over a suitable catalyst such as, for example, vanadium pentoxide at an elevated temperature, for example, from 400–450° C. The reaction is conveniently expressed in the following equation:

$$2C_{10}H_8 + 9O_2 \rightarrow 2C_8H_4O_3 + 4H_2O + 4CO_2$$

While this is the main reaction, other reactions are possible and, in fact, do occur with the formation of products representing a lesser degree of oxidation of the napthalene or a greater degree of oxidation. Some by-products are formed, due to the decarboxylation of napthalene, either with or without subsequent oxidation. Examples of these by-products formed in this manner are benzoic acid, benzene, maleic acid, etc., which are present in greater or less quantities as impurities in the phthalic anhydride produced.

Our invention has for an object the production of a purer phthalic anhydride than it has heretofore been possible to produce. An additional object is the elimination of side reactions and the attendant formation of maleic acid or benzoic acid, etc. Other objects will appear hereinafter.

We have found that the decarboxylation and side reactions are due to the presence in the catalyst chamber of one or more metals which catalyze the side reactions. By the proper selection of structural materials from which the catalyst chamber is formed, this type of side reaction can be minimized or entirely suppressed. To accomplish this result, it is necessary to eliminate from the catalyst chamber metals which oxidize readily under the conditions of the reaction and metals which form unstable phthalates. We find it desirable to eliminate from the catalyst chamber the oxide of the heavy metals, such as iron, copper, etc., and to have present in the reaction chamber only the catalyst in the oxide form.

Our invention in its broad form consists in selecting as materials for the construction of the catalyst chamber metals which do not readily oxidize under the operating conditions, such as, for example, nickel or metals whose oxides are too weakly basic to form phthalates under the temperature conditions and vapor concentration existing in the converter, such as, for example, aluminum. It is, of course, desirable to have the catalyst which is employed, free from oxides of the heavy metals. By selecting for the construction of the catalyst chamber metals falling under the non-oxidizing or non-phthalate forming classes, either the oxides are not formed or the metallic phthalates are not formed, decarboxylation does not take place, and the phthalic anhydride produced is free from undesirable impurities.

The new process, therefore, consists of the method of preparation of phthalic anhydride by the catalytic oxidation of naphthalene in the vapor phase, in which there is substituted for the iron or steel commonly employed as materials for the construction of the catalyst chamber either (1) a metal which does not oxidize under the conditions of operations or (2) a metal whose oxide is insufficiently basic to form stable phthalates, and which is, therefore, not reduced by the hot naphthalene vapor. As examples of the first class of metals are such metals as nickel, chromium, silver, nickel-chromium-iron alloys, chromium-iron alloys, silicon-iron alloys, and iron alloys of the type known as stainless steels as well as alloys of the "Stellite" type, which are chromium-tungsten-cobalt alloys. As examples of the second class of metals are aluminum, calorized iron, etc.

Examples of our invention are as follows:

*Example 1.*—A ⅝ inch inner diameter iron tube is filled with ¼ inch lumps of vanadium pentoxide, placed in a lead bath, heated to 450° C., and a mixture of naphthalene vapor and air in a ratio of 1:20 passed through the tube. The resulting phthalic anhydride when condensed in the usual manner is found to contain about 5% of maleic acid, resulting from the decarboxylation of phthalic anhydride to benzene and the subsequent oxidation of the benzene.

*Example 2.*—When a ⅝ inch inner diameter nickel tube is used in precisely the same manner as in Example 1 and with the conditions of operation identical with those in Example 1, phthalic anhydride was produced containing no detectable maleic acid.

Any suitable modifications and changes may be made without departing from the spirit and scope of the invention, which we wish to be limited only to the extent defined in the claims.

We claim:

1. In the process of catalytically oxidizing naphthalene to form phthalic anhydride, the step which comprises carrying out the reaction in a vessel the interior of which is formed of a metal which does not oxidize under the conditions of the reaction.

2. In the process of catalytically oxidizing naphthalene to form phthalic anhydride, the step which comprises carrying out the reaction in a vessel the interior of which is formed of chromium.

3. In the process of catalytically oxidizing naphthalene to form phthalic anhydride, the step which comprises carrying out the reaction in a vessel the interior of which is formed of nickel.

4. In the method of catalytically oxidizing naphthalene to form phthalic anhydride, the step which comprises passing air and vaporized naphthalene through a catalytic chamber the inner walls of which are formed of a metal which does not oxidize under the conditions of the reaction.

5. In the method of catalytically oxidizing naphthalene to form phthalic anhydride, the step which comprises passing air and vaporized naphthalene through a catalytic chamber the inner walls of which are formed of chromium.

6. In the method of catalytically oxidizing naphthalene to form phthalic anhydride, the step which comprises passing air and vaporized naphthalene through a catalytic chamber the inner walls of which are formed of nickel.

7. In the process of catalytically oxidizing naphthalene to form phthalic anhydride, the step which comprises carrying out the reaction in a vessel the interior of which is formed of silver.

8. In the method of catalytically oxidizing naphthalene to form phthalic anhydride, the step which comprises passing air and vaporized naphthalene through a catalytic chamber the inner walls of which are formed of silver.

In testimony whereof we affix our signatures.

WILLIAM S. CALCOTT.
NORMAN C. SOMERS.